United States Patent [19]
LaCroix

[11] 3,944,505
[45]*Mar. 16, 1976

[54] CATALYTIC STRUCTURE

[75] Inventor: Roger Claude LaCroix, Suresnes, France

[73] Assignee: Comptoir Lyon-Alemond-Louyot, Paris, France

[ * ] Notice: The portion of the term of this patent subsequent to Sept. 23, 1992, has been disclaimed.

[22] Filed: July 22, 1974

[21] Appl. No.: 490,247

[30] Foreign Application Priority Data
Aug. 6, 1973    France ............................... 73.28721

[52] U.S. Cl. ....... 252/466 B; 252/477 R; 423/213.5
[51] Int. Cl.² ...................... B01J 21/04; B01J 23/42
[58] Field of Search ......... 252/466 J, 477 R, 466 B; 423/213.2, 213.5

[56] References Cited
UNITED STATES PATENTS

| | | | |
|---|---|---|---|
| 2,720,494 | 10/1955 | Suter et al. ..................... | 23/288 FC |
| 3,434,826 | 3/1969 | Holzmann .......................... | 23/288 R |
| 3,773,894 | 11/1973 | Bernstein et al................ | 252/474 X |
| 3,819,334 | 6/1974 | Yoshida et al.................. | 23/288 FC |

*Primary Examiner*—W. J. Shine
*Attorney, Agent, or Firm*—Bacon & Thomas

[57] ABSTRACT

A catalytic device is made up of a stack of expanded metal sheets held spaced apart by wires between the sheets. The assembly is welded together to form a rigid block and the expanded metal sheets having a coating of metal aluminide covered with alpha alumina which in turn has a catalytic surface thereon.

4 Claims, 4 Drawing Figures

U.S. Patent    March 16, 1976    3,944,505
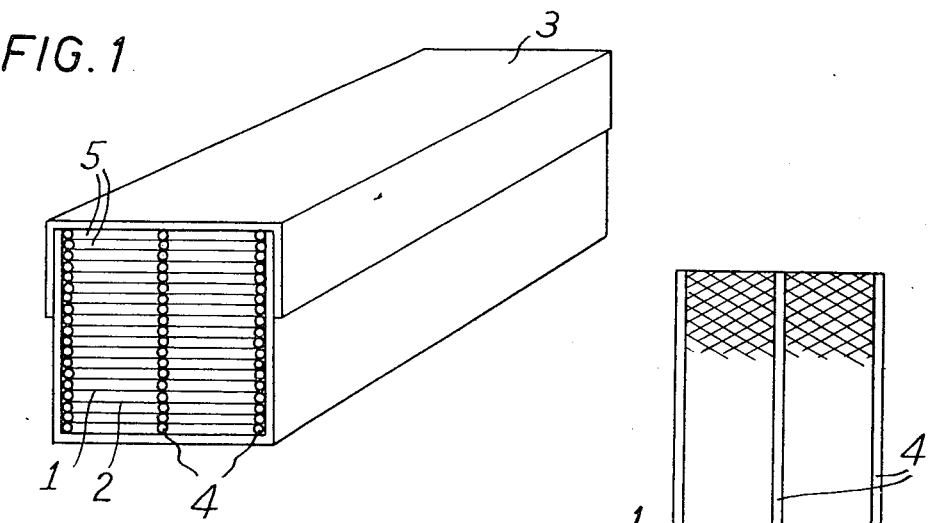
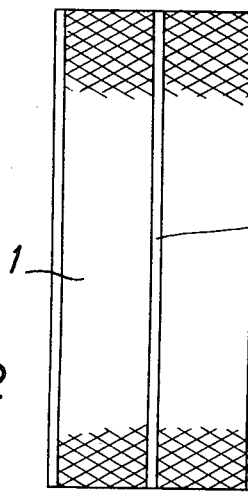
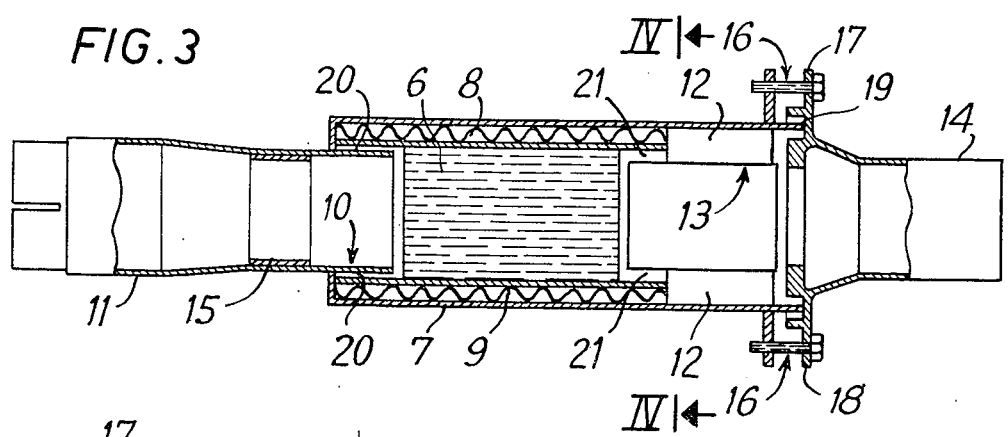
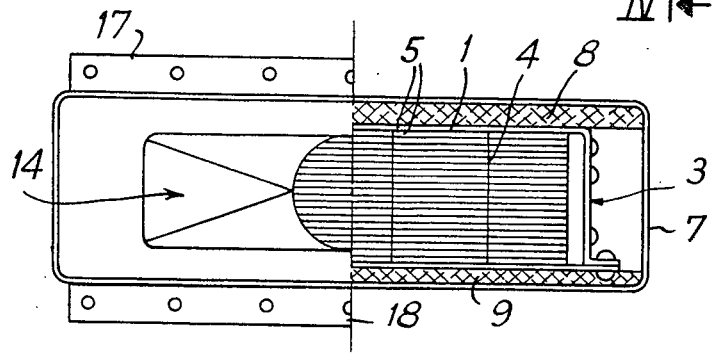

CATALYTIC STRUCTURE

The present invention relates to catalytic structures and to the means for their location within an exhaust system for waste gases.

In copending application Ser. No. 342,087, filed Mar. 16, 1973, the Applicant has already described catalysts and, also, catalytic structures prepared from such catalysts, for converting the undesirable gases which are commonly found in vehicle exhaust gases. In particular, honeycomb structures have been described which are constituted by a stack of thin plates which are alternatively flat and wavy. These plates are of stainless steel, preferably expanded.

The expanded stainless steel plates preferably carry (1) a layer of at least one aluminide of nickel or of cobalt, (2) a layer of $\alpha$-alumina and (3) at least one catalytic surface layer, which can be deposited on a layer of $\gamma$ or $\eta$ alumina.

The catalysts or catalytic structures which are most particularly utilisable for the purposes mentioned above should have the following properties:

large surface area with respect to apparent volume;
as large as possible a contact surface with the fluid to be treated;
lowest possible resistance to flow of the fluid; resistance to thermal shock;
resistance to mechanical shock and to vibrations; resistance to corrosion;
maintenance of an effective catalytic action over extended periods.

The new catalytic structures according to the present invention have these properties.

According to the present invention, a catalytic structure is provided which comprises a plurality of sheets of metal or metal alloy carrying (1) a layer of at least one aluminide of nickel or cobalt, (2) a layer of $\alpha$ alumina and (3) at least one catalytic surface layer, which can be deposited upon a layer of $\gamma$ or $\eta$ alumina, wherein the structure is formed by stacking flat expanded metal sheets which are spaced from one another and disposed within a rigid block, the distance between the sheets being 0.5 to 2.5 mm, the transparency of the stack of sheets being from 20% to 80% and the thickness of the sheets before expansion being from 0.05 to 0.25 mm.

The sheets can be maintained at the desired mutual spacing by wires interposed so as to form parallel channels of rectangular section. The sheets can also be soldered or welded together by means of the interposed wires.

According to one preferred embodiment of the invention, the expanded metal sheets have a transparency of 45 to 60% and have mesh openings with a diagonal dimension of 1.2 to 4 mm, the width of the strip separating adjacent meshes being from 0.1 to 0.4 mm.

Each expanded sheet structure is defined communally by three groups of digits. The first group indicates the length of the greatest diagonal of the elementary mesh opening in mm, the second group indicates the width of the strip in mm and the third group indicates the thickness of the sheet before displacement (expansion) in mm.

The sheet structures used preferably in the invention are:

a. 1.45–12–10, having 18,600 meshes per dm$^2$ and having an optical transparency of 52%;
b. 1.45–12–20 having 18,600 meshes per dm$^2$ and having a transparency of 50%;
c. 2.5–25–20 comprising 7,400 meshes per dm$^2$ and having a transparency of 48%;
d. 3–34–20 comprising 3,940 meshes per dm$^2$ and having a transparency of 58%.

The present invention also relates to a device for locating a catalytic structure inside a housing forming part of an exhaust system for waste gases, in which the structure is maintained within the housing by means of at least one metal pad or spacer disposed on all or part of the exterior imperforate surface of such structure. The exterior imperforate surface of the structure is exterior surface of the rigid block partially surrounding the stack of sheets.

On leaving the catalytic structure, the waste gases can pass inside an exhaust tube located inside the housing provided in the structure and if required held within the housing by at least one metal pad or spacer. This tube serves in particular to allow the greater part of the waste gases to pass through the catalytic structure.

The device according to the invention can advantageously be completed upstream by means of a gas inlet tube, welded to the housing, fitted into the structure and provided with director blades allowing the gas stream to be oriented so that it flows uniformly through all the catalytic structure.

Other features and advantages of the apparatus of the invention will appear from the following description of preferred embodiments, given by way of illustration in conjunction with the accompanying drawing, in which:

FIG. 1 is a diagrammatic view in perspective of a catalytic structure according to the invention;

FIG. 2 is a diagrammatic view of an expanded sheet;

FIG. 3 is a longitudinal section of a mounting device for the catalytic structure;

FIG. 4 is a part-elevational part-sectional view along the line IV—IV of FIG. 3.

EXAMPLE 1

Formation of a catalytic structure according to the invention of the multi-channel type (FIGS. 1 and 2)

In FIGS. 1 and 2, it will be seen that this structure is constituted by a stack of expanded metal sheets, such as 1 and 2, which may be soldered or welded together, surrounded by a rigid structure 3. The expanded metal sheets referred to herein are a well known structure wherein a sheet of metal is provided with rows of staggered slits and tension is then applied to the sheet in a direction perpendicular to the slits so that the latter open up to define generally diamond shaped openings having one long dimension. The sheet is thus provided with a multiplicity of openings therethrough. Such sheets are often characterized as having a certain transparency, which is the percentage of the total area of the expanded sheet constituted by the openings. The foregoing are well known in the art. These sheets are maintained at a predetermined distance from one another by interposed wires 4, such that channels 5 of rectangular section are thus formed. Each sheet measures 35 × 80 mm. The stack comprises 25 sheets. The sheets are of expanded "Inconel" (R.T.M.) and the expansion is characterised by:

| | |
|---|---|
| largest diagonal dimension | 3 mm |
| width of inter-mesh metal strip | 0.34 mm |
| thickness of sheet before expansion | 0.2 mm |

-continued overall thickness of the expanded sheet     0.4 mm

They are electrically welded to the expanded metal. The various sheets are stacked or welded to one another by electric welding along the generatrices of the cylinders which constitute the interposed wires.

The free cross-section offered to the passage of fluid is about 62% of the overall cross-section. For a block comprising 19 sheets, the back pressure of a gas at 315°C having a space velocity of 50,000 volumes per hour is about 2 mm of water.

EXAMPLE 2

This example describes the catalytic efficiency and resistance to shock of a catalytic structure such as described in Example 1, comprising 25 sheets on which in all 0.3 g of platinum has been deposited.

The gas, having the following composition by volume, was passed through this structure:

| | |
|---|---|
| CO | 1.45% |
| NO | 0.21% |
| $C_3H_8$ | 190 ppm |
| $CO_2$ | 13.5% |
| $O_2$ | 1.45% |
| $N_2$ | 83.39% |

The throughput was 50,000 volumes/hour. The gas was heated at an increasing temperature and the temperature of the catalyst was recorded and the CO content of the effluent gas at the outlet was measured. Catalytic efficiency is measured by:

the maximum conversion yield of CO to $CO_2$, which should be as high as possible;
the temperature for which the yield is 90%;
the temperature which corresponds to the maximum yield.

The values found were:
maximum yield: 98%;
temperature of 90% yield: 352°C;
temperature of maximum yield: 370°C.

For measuring the resistance to shock, the 25 sheets were formed into a rigid block of Inconel, as shown in FIG. 1. The block and its contents were then mounted in an envelope resembling that which is mounted in motor cars. Elastic metal pads or spacer wedges were then interposed between the envelope and the rigid block. The shocks were produced by dropping the assembly on a steel sheet from a known height. The intensity of one shock is 0.0485 kgm. 775 shocks were effected or 37.5 kgm. After this treatment, the structure according to the invention had undergone no loss of material and maintained intact its catalytic efficiency.

It can thus be concluded with surprise that, by reason of a synergistic effect between the structure and the catalytic deposit, the catalytic efficiency of the catalyst obtained with the structures according to the invention is superior to that of the same catalytic deposits applied to known supports; the resistance to shocks and vibrations of the metallo-ceramic structures according to the invention is out of proportion to that of known structures; the advantages which are given are acquired without the resistance to the passage of fluids being higher than that of the best known catalytic structures.

EXAMPLE 3

Formation of a mounting device for a catalytic structure according to the invention inside a housing forming part of an exhaust system for waste gases In FIGS. 3 and 4, a catalytic structure 6 is shown introduced into a housing 7. The structure 6 is held rigidly in the vertical sense by two metal pads 8 and 9. In the longitudinal direction, the structure 6 is held upstream by the extension 10 of an inlet tube 11 for the gases and downstream by a pad mounting ring 12 and by an exhaust tube 13 which is supported by an outlet pipe 14. The extension 10 of the gas inlet tube 11 and the tube 13 fit into the structure 6. Director baffles 15 are provided inside the tube 11, which allow the gaseous flow to be directed so that it passes uniformly through all the structure 6.

The assembly is rigidly fixed by bolts 16 and flanges 17 and 18. The ring 12 is constituted, like the pads 8 and 9, by a metal mesh or by corrugated expanded sheet metal. Sealing of the device is ensured by ring seals 19.

The tube 13 allows the greater part of the exhaust gases to pass through the structure 6. Consequently, only a slight amount or none at all of the gases passes through the pads 8 and 9, despite the absence of a plastic joint of asbestos or elastomeric material between the structure 6 and the housing 7. The gases arrive at the upstream tube 11 with a high velocity and, by their dynamic effect, produce a subpressure in the space 20 and, in contrast, an over-pressure in the space 21. This phenomenon reduces or completely avoids the loss of gases. Also, it will be seen that in the mounting device according to the invention the catalytic structure need not be fixed by any rivet or bolt to the various components which guide the flow of the gases. This fact allows the device to be lightened and thus minimises the effects of shocks and vibrations.

The channels 5 defined by the sheets 1 and 2 and the interposed wires 4 allow the gases to flow through the structure 6 without excessive turbulence and, consequently, without any excessive back-pressure to this flow arising.

It is desirable to ensure that the temperature of the structure 6 does not exceed 700°C. For this, the shape is made accordingly, the external surface of the rigid block 3 being made large with respect to the volume of the structure, and/or known means are employed, such as the injection of fresh air at certain points in the apparatus.

According to a variant, the assembly of the exterior surface of the rigid block 3 can be surrounded by metal fixing pads. The metal pads used in the present invention can be made of metal mesh or can be formed by at least one corrugated metal sheet held between two flat sheets. The corrugated sheet(s) can be of expanded metal.

What we claim is:

1. A catalytic structure comprising:
   a stack of expanded metal sheets arranged in generally parallel relation and spaced apart a distance of about 0.5 to 2.5 mm, the transparency of each sheet being from 20 to 80% and the thickness of the sheets before expansion being from 0.05 to 0.25 mm;
   means holding said sheets in said spaced relation in the form of a rigid block; and each sheet having thereon a layer of at least one metal aluminide, wherein the metal of said metal aluminide is selected from the group consisting of nickel and cobalt, said metal aluminide layer being covered with a layer of alpha alumina supporting a catalytic surface layer of platinum.

2. A structure as defined in claim 1 wherein said means holding said sheets in spaced relation include wires extending between adjacent sheets.

3. A structure as defined in claim 2 wherein said sheets and wires are welded together.

4. A structure as defined in claim 1 wherein the transparency of said sheets is from 45 to 60%, wherein their openings have a largest diagonal dimension of from 1.2 to 4 mm, and wherein the spacing between said sheets is from 0.1 to 0.4 mm.

* * * * *